(12) United States Patent
Axelrod

(10) Patent No.: US 7,694,653 B2
(45) Date of Patent: Apr. 13, 2010

(54) ANIMAL CHEW CONTAINING HARD AND SOFT CHEWING SURFACES

(75) Inventor: Glen S. Axelrod, Colts Neck, NJ (US)

(73) Assignee: T.F.H. Pulications, Inc., Neptune City, NJ (US)

( * ) Notice: Subject to any disclaimer, the term of this patent is extended or adjusted under 35 U.S.C. 154(b) by 950 days.

(21) Appl. No.: 10/643,168

(22) Filed: Aug. 18, 2003

(65) Prior Publication Data

US 2005/0042339 A1    Feb. 24, 2005

(51) Int. Cl.
*A01K 29/00* (2006.01)
(52) U.S. Cl. .................................... 119/709; 119/707
(58) Field of Classification Search .......... 119/707–711
See application file for complete search history.

(56) References Cited

U.S. PATENT DOCUMENTS

| 5,148,770 | A | * | 9/1992 | O'Rourke | 119/709 |
| 5,174,243 | A | * | 12/1992 | O'Rourke | 119/709 |
| 5,191,856 | A | | 3/1993 | Gordon | |
| 5,263,436 | A | | 11/1993 | Axelrod | 119/710 |
| 5,476,069 | A | | 12/1995 | Axelrod | 119/709 |
| 5,560,320 | A | | 10/1996 | Plunk | |
| 5,827,565 | A | | 10/1998 | Axelrod | 426/623 |
| 5,941,197 | A | | 8/1999 | Axelrod | 119/710 |
| 6,093,427 | A | | 7/2000 | Axelrod | 426/104 |
| 6,093,441 | A | | 7/2000 | Axelrod | 426/632 |
| 6,110,521 | A | | 8/2000 | Axelrod | 426/549 |
| 6,126,978 | A | | 10/2000 | Axelrod | 426/285 |
| 6,159,516 | A | | 12/2000 | Axelrod et al. | 426/456 |
| 6,180,161 | B1 | | 1/2001 | Axelrod | 426/623 |
| 6,186,096 | B1 | | 2/2001 | Miller | |
| 6,202,598 | B1 | | 3/2001 | Willinger | 119/709 |
| D453,242 | S | * | 1/2002 | Kaplan | D30/160 |
| 6,415,741 | B2 | * | 7/2002 | Suchowski et al. | 119/711 |
| 6,474,268 | B1 | | 11/2002 | Suchowski et al. | 119/709 |
| 6,676,481 | B2 | * | 1/2004 | Klaus et al. | 446/489 |
| 7,017,523 | B2 | * | 3/2006 | Handelsman | 119/707 |
| 7,063,044 | B2 | * | 6/2006 | Handelsman et al. | 119/709 |
| 2003/0079693 | A1 | | 1/2003 | Jager | 119/707 |

FOREIGN PATENT DOCUMENTS

EP    0906723    4/1999

OTHER PUBLICATIONS

Merriam-Webster's Collegiate Deictionary, Tenth Edition 1993, definition of "overlie".*
European Search Report dated Jul. 28, 2009 issued in related European Patent Application No. 04781527.9.

* cited by examiner

*Primary Examiner*—Kimberly S Smith
(74) *Attorney, Agent, or Firm*—Grossman, Tucker, Perreault & Pfleger, PLLC

(57) ABSTRACT

An animal chew for chewing by an animal comprising a body portion including an outer layer having a first hardness, the body portion having a first and second end sections with an edge thereof. An end piece is supplied having a hardness that is greater than the first hardness, the end piece configured to engage with the body portion, wherein the end piece protects the edge section of the end piece from contact by the animal during chewing.

6 Claims, 3 Drawing Sheets

ANIMAL CHEW CONTAINING HARD AND SOFT CHEWING SURFACES

FIELD OF THE INVENTION

The present invention relates to an animal chew, and more particularly to an animal chew presenting both hard and soft chewing surfaces. More specifically the present invention is directed at an animal chew, wherein an outer soft chewing layer is uniquely configured to avoid or minimize the presence of an exposed edge, thereby lowering the possibility of a chewing animal to tear or otherwise damage and/or fragment the outer soft chewing layer. This configuration therefore protects a soft outer surface of, e.g., the shank or body portion of a simulated pet bone containing a soft chewing layer from being damaged thereby extending the useful life of the chew.

BACKGROUND OF THE INVENTION

Most dogs enjoy chewing on things although preferences vary as to the hardness of the substances favored. Some dogs like to chew on very hard materials such as cow bones, wood, nylon or polyurethane, others prefer softer chews such as rawhide, while still others favor freeze dried snacks. Some dogs, due to their age, may not be able to chew on the hard substances. Young dogs have insufficiently developed teeth, while old dogs may have diseased gums or may have lost some of their teeth.

In addition to the variety of chewing desires and needs of different dogs there is also the consideration that as one lowers the hardness of a material designated for chewing, the strength of a given chewing action may overcome the strength of the material, and the chew is susceptible to more rapid destruction. In that regard, efforts have been made to provide a chew toy that maintains the interest of an animal in a soft chewing medium, but which soft chew medium maintains itself intact in the chewing environment.

Along such lines, attention is directed to U.S. Pat. No. 6,474,268 entitled "Composite Chew Toy". A synthetic chew toy is disclosed which is said to be formed of two different materials. The toy is described as requiring a rigid synthetic frame, supporting a softer chew portion. More specifically, a frame is shown (FIGS. 1-4) with what is described as four bulbous portions 210 at the ends thereof to simulate a bone shape. The frame is said to include a support shelf 220 having an inner wall 225 defining an opening 226 in the shape of an elongated oval. The frame 200 is also said to include a support wall 230 surrounding and perpendicular to the shelf 220 such that the shelf extends inward and perpendicular to an inner wall 231 of support wall 230. The '268 patent states that the rigidity of the frame provides structure, support and durability for the chew toy, and that the relatively softer chew portion can provide beneficial effects to a pet's teeth and gums, or provide greater chewing pleasure.

Attention is also directed to U.S. Pat. No. 5,263,436 entitled "Bone-Shaped Therapeutic Device". A bone-shaped therapeutic chew toy device is disclosed for a dog consisting of material molded in a form having sharp conically shaped spikes distributed over its surface. The materials mentioned include polyethylene or a polyester or a polyamide having a durometer of 50-90.

The field of animal chews has also developed wherein a number of disclosures have occurred directed at those types of chews that may be characterized as edible based compositions. For example, attention is also directed to the following U.S. Patents, commonly owned by the assignee herein: U.S. Pat. No. 5,476,069 entitled "Molded Rawhide Chew Toy"; U.S. patent application Ser. No. 08/923,070 filed Sep. 3, 1997 entitled "Vegetable Based Dog Chew" now U.S. Pat. No. 6,093,427; U.S. patent application Ser. No. 08/738,423 filed Oct. 25, 1997 entitled "Edible Dog Chew" now U.S. Pat. No. 5,827,565; U.S. patent application Ser. No. 08/784,834 filed Jan. 17, 1997 entitled "Carrot-Based Dog Chew" now U.S. Pat. No. 5,941,197; U.S. patent application Ser. No. 09/114,872 filed Jul. 14, 1998 entitled "Heat Modifiable Edible Dog Chew" now U.S. Pat. No. 6,180,161; U.S. patent application Ser. No. 09/138,804 filed Aug. 21, 1998 entitled "Improved Edible Dog Chew" now U.S. Pat. No. 6,126,978; U.S. patent application Ser. No. 09/116,070 filed Jul. 15, 1998 entitled "Wheat & Casein Dow Chew With Modifiable Texture" now U.S. Pat. No. 6,110,521; U.S. patent application Ser. No. 09/116,555 filed Jul. 15, 1998 entitled "Heat Modifiable Peanut Dog Chew" now U.S. Pat. No. 6,093,441; U.S. patent application Ser. No. 09/227,767 filed Jan. 8, 1999 entitled "Method of Molding Edible Starch" now U.S. Pat. No. 6,159,516.

It is therefore an object of the present invention to provide an animal chew that offers chewing surfaces having different hardness values to satisfy different chewing preferences, and which provides a simpler, more economical, improved and longer-lasting design over the prior art.

It is therefore a related and more specific object of the present invention to provide an animal chew that offers chewing surfaces having different hardness values, wherein the edges of the softer surface are strategically concealed, at least in part, and wherein said edges may also be employed to secure the softer surface to the chew, thereby reducing the tendency to tear at an edge location, which therefore increases the life expectancy of the chew toy in the chewing environment.

SUMMARY OF THE INVENTION

An animal chew for chewing by an animal comprising a body portion including an outer layer having a first hardness, said body portion having first and second end sections with an edge thereof and an end piece having a hardness that is greater than the first hardness. The end piece is configured to engage with said body portion, wherein said end piece protects said edge section of said body portion from contact with said animal during said chewing.

BRIEF DESCRIPTION OF THE DRAWINGS

Features and advantages of the present invention will be apparent from the following description of exemplary embodiments, which description should be understood in conjunction with the accompanying drawings, wherein.

DETAILED DESCRIPTION OF THE INVENTION

As noted above, the present invention is directed at an animal chew for chewing by an animal comprising a body portion including an outer layer having a first hardness, said body portion having first and second end sections with an edge thereof; and an end piece having a hardness that is greater than the first hardness, the end piece configured to engage with said body portion, wherein said end piece protects said edge section of said body portion from contact with said animal during said chewing.

Preferably, the animal chew end piece protects said edge section of said body portion by at least partially overlying said edge section, or completely overlying said edge section under circumstances where said end piece is sealingly engaged to the body portion. In addition, preferably, the end piece that is configured to engage with said body portion comprises an opening, wherein said body portion having a first and second end section with an edge thereof is configured to engage with said opening, and wherein said opening compresses upon said end section when said edge section is engaged with said opening.

Alternatively considered, the animal chew includes an opening in an end piece wherein said opening defines a diameter $d_1$, and said body portion which has a first and second end section defines a diameter $d_2$ at said first and second end section, and $d_1 < d_2$. In such manner, a tension fit will be produced as between the end piece and the body portion.

Furthermore, in the context of the present invention, the outer layer of said body portion comprises an elastomer, which in particular preferred embodiment comprises natural rubber, and the first and second end pieces comprise a thermoplastic material, such as a nylon type resin. Further preferred materials of construction are noted herein.

In addition, it should be noted that the body portion may comprises a core that is at least partially covered by said outer layer, and the core may preferably comprise a nylon material. Optionally, at least one of said body portion and said first and second end pieces may include a plurality of protrusions, such as conical protrusions. The body portion outer layer also preferably has a hardness on the Shore A Scale, in the range of between about 40 and 90A. The first and second end pieces preferably have a hardness on the Shore D Scale, in the range of between about 50 and 90D. With respect to such recited hardness values, all incremental values and all incremental ranges therebetween are contemplated herein.

Preferably, the animal chew first and second end piece and said first and second end of said body portion include at least one cooperating hole, and said first and second end pieces are connected to said first and second end of said body portion by providing a dowel and extending said dowel through said cooperating holes in the respective first and second end piece and first and second end of said body portion.

Figure 1:
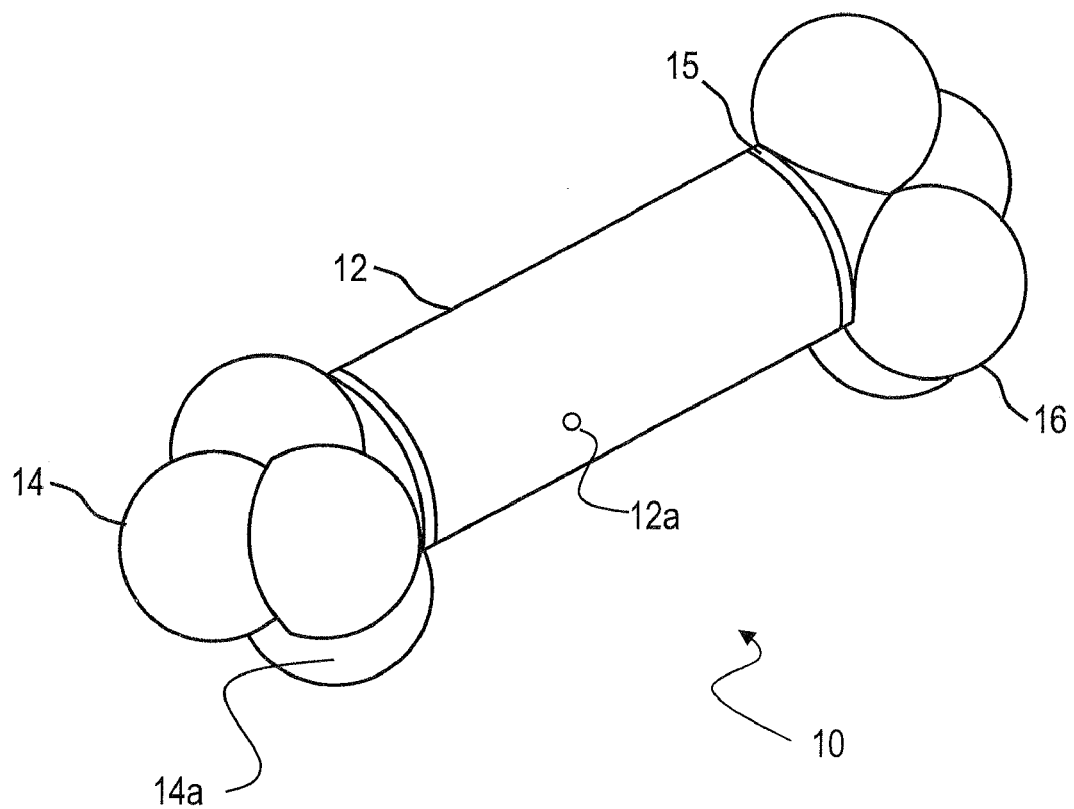
FIG. 1 is a perspective view of an exemplary animal chew consistent with the present invention.
Figure 2:
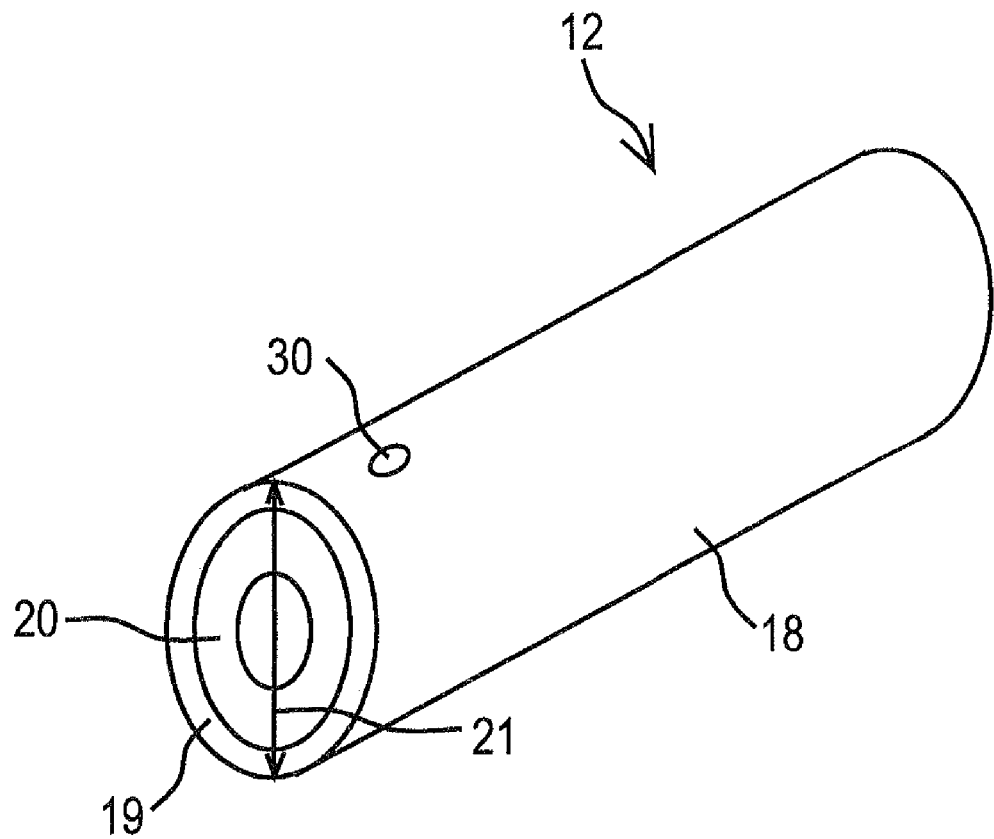
FIG. 2 is a perspective view of an exemplary shank of the exemplary animal chew illustrated in FIG. 1.
Figure 3:
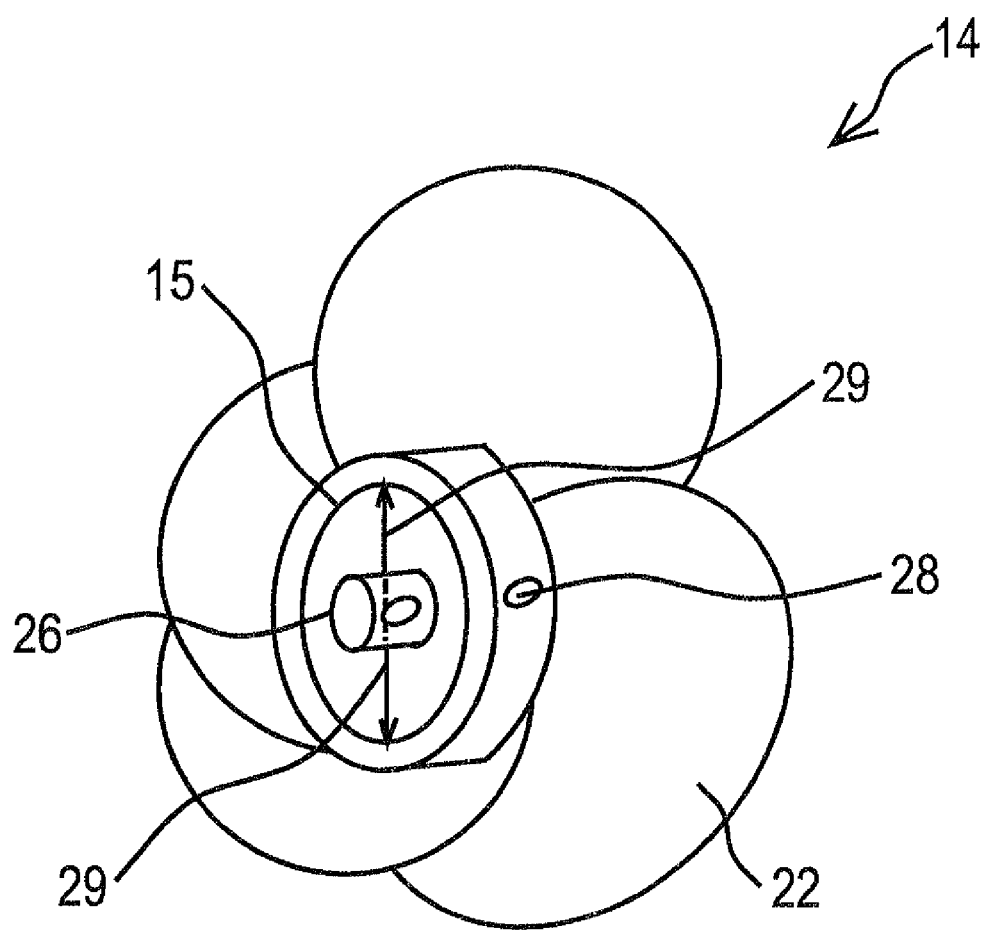
FIG. 3 is a perspective view of an exemplary end piece of the animal chew illustrated in FIG. 1.

Referring to FIGS. 1 through 3 there is illustrated an exemplary animal chew toy 10 consistent with the present invention. The animal chew 10 may be provided having a generic "dog bone" shape, including a body portion 12 having an end piece 14, 16 at either end of the shank 12. It will be appreciated, of course, that the invention is susceptible to numerous alternative configurations. The shank 12 of the animal chew 10 may have a soft and/or resilient outer surface, while the end pieces 14, 16 are a relatively hard material. An optional raised ridge section 15 may be included as part of the end pieces 14 and 16. This configuration provides an animal with both a soft chewing surface and hard chewing surface.

In addition to providing both soft and hard chewing surfaces, the animal chew 10 consistent with the present invention is provided so that the end pieces 14, 16 overlie at least a portion of each respective end of the shank 12. The outer layer of the shank 12 may be a continuous feature. Therefore, when the end pieces 14, 16 are assembled overlying a portion of each end of the shank 12 the shank 12 does not present any exposed edges. Because there are no exposed edges there is a reduced possibility of a chewing animal being able to tear or otherwise damage and/or fragment the outer layer. This configuration, therefore, protects the soft outer surface of the shank 12 from being damaged, and extends the useful life of the chew.

Turning to FIG. 2, one exemplary configuration of the shank 12 is illustrated separated from the end pieces 14, 16. The exemplary shank 12 may have a generally tubular shape. An elastomeric outer layer 18 with edge 19 provides the shank 12 with the desired soft and/or resilient chewing characteristics. This elastomeric outer layer 18 may be supported by a core 20 of a more rigid and/or higher strength material. The diameter of the body portion shown generally at 21 is herein designated as "$d_2$".

However, in the broad context of the present invention the elastomeric outer layer 18 may comprise the entirety of the shank 12. In other words, the entire shank 12 through the cross-section 21 is made of an elastomeric or rubber material as herein described. That is, the outer layer 18 and the entirety of the shank or body portion 12 may be formed from any elastomeric or rubber material and preferably one that provides a generally soft and/or resilient chewing surface. Exemplary materials may include: natural rubber, polyurethane rubber, thermoplastic elastomer, and various other soft and/or resilient materials that will be understood by those of skill in the art.

The core 20 may generally be included to provide structure and rigidity to the shank 12. Accordingly, the core may be a generally rigid thermoplastic or thermoset polymer material. Exemplary materials may include engineering thermoplastics such as nylon, polyester, polycarbonate, etc., or even less rigid thermoplastics such as polyolefins.

The elastomer outer layer 18 of the shank 12 is thick enough to give a soft, resilient chewing characteristic. It may be necessary to provide a thicker outer layer 18 when the core is a very hard material and/or is very thick in order to maintain the soft or resilient chewing characteristic of the shank 12. Additionally, the outer layer 18 is preferably made of a thickness sufficient to withstand being chewed without itself fragmenting.

Turning next to FIG. 3, an exemplary end piece 14 is shown. As shown, in the interest of providing a generic bone shaped chew, the end piece 14 may generally be formed as a bulbous body 22, although, this shape is merely a design choice that may be varied according to the intended appearance of the chew 10. The end piece 14 further includes an opening 24 that is sized to at least partially receive the shank 12. Opening 24 is defined herein to define a diameter "$d_1$" shown generally at 29.

The end pieces 14, 16 may be formed from a relatively hard material, as compared to the shank 12. The combination of the hard end pieces 14, 16 and the softer shank 18, provides the animal chew 10 with both hard and soft chewing surfaces. Preferably the end pieces 14, 16 are formed of a rigid thermoplastic or thermoset material. Exemplary materials may include nylon, polyester, polycarbonate, etc.

The shank 12 and end pieces 14, 16 are assembled by fitting each end of the shank 12 in to one of the respective end piece 14, 16. The ends of the shank 12 are received in the openings 24 of the end pieces 14, 16 so that the end piece 14, 16 overlies at least partially, and preferably completely, the ends 19 of the shank 12. This aspect of the animal chew 10 uniquely protects the outer layer 18 of the shank 12 by avoiding the presentation of an edge section 19 of the outer layer 18. Because each end of the shank 12 is received in the opening 24 of a respective end piece 14, 16 when an animal is chewing on the toy 10 the animal will not be able to get at a free edge 19 of the outer layer 18 of the shank 12. Not only will this increase the life of the chew 10, but it reduces the probability of an animal in tearing off a piece of the outer layer 18.

It should be understood that this aspect does not require that the outer layer 18 of the shank be completely coextensive with the core 20. It only requires that the edge 19 of the shank 12 ultimately be concealed by end pieces 14 and 16. Similarly, the edge 19 of outer layer 18 may even extend beyond the core 20, but ultimately become accommodated within and covered by end pieces 14 and 16.

The shank 12 may be optionally secured to the end pieces 14, 16 using a pin or dowel, not shown. Consistent with this optionally approach, each end piece 14, 16 may include at least one transverse hole 28 adjacent to, and extending into the opening 24 for receiving the shank 12. Each end of the shank 12 also includes a hole 30 extending through the shank 12. When the end pieces 14, 16 are assembled to the shank 12, the holes 28 in the end pieces 14, 16 are aligned with the hole 30 in the shank 12. A dowel or pin may then be inserted through the holes 28, 30 at each end, thereby securing the end pieces 14, 16 to the shank 12.

In the above method of securing the shank 12 and end pieces 14, 16, the dowel may be retained in position using a number of common techniques. First, the dowel may be sized to achieve a press or interference fit with at least one of the holes 28, 30. The resilient nature of the outer layer 18 of the shank 12 may be especially suitable for providing a press fit. Alternatively, the dowel may be heat staked in place or sonically or thermally welded to either the end piece 14, 16 or shank 12. The dowel may also be adhesively bonded, etc. to one or more of the end piece 14, 16 and shank 12.

According to another embodiment, the end piece 14 may include a protrusion 26 generally centrally disposed in the opening 24. When the animal chew 10 is assembled, the protrusion 26 may be at least partially received in the tubular core 20 of the shank 12. This interaction may provide a stronger connection between the end pieces 14, 16 and the shank 12. The previously described dowel approach to retaining the shank 12 and end pieces 14, 16 may still be used for assembling the animal chew 10. However, the protrusion 26 also improves the suitability of alternative methods. If the shank 12 is provided with a rigid core 20, it may be possible to join the protrusion 26 and core 20, such as by thermal welding, sonic welding, adhesive bonding, etc.

According to one aspect, the shank 12 and/or the end pieces 14, 16 may be provided with surface features that may enhance oral stimulation and provide hygiene benefit when chewed. These features may include nodules or other varieties of protrusions 12a, 14a. One exemplary embodiment of such features may include conical protrusions. The conical protrusions may be of varying sizes, i.e., diameters, heights, etc.

In other embodiments, the protrusions may include cylindrical projections from the shank and/or end pieces. Similarly, the shank and/or end pieces may include ribs or ridges that may be arranged longitudinally or circumferentially, etc. on the animal chew 10. The protrusions may be configured to stimulate an animal's gums and/or clean the animal's teeth when the animal chews on the toy 10.

Consistent with still further embodiments, the shank 12 and or the end pieces 14, 16 may include additives such as an attractant and or a flavorant. Additives of this nature may be mixed with the polymer materials prior to molding the various components of the animal chew 10. Additionally, attractants may be provided in a hollow in the shank 12 or end pieces 14, 16. When such a configuration is used it may be advantageous to provide holes or vents providing air flow between the attractant and the exterior of the animal chew 10.

The shank 12 and end pieces 14, 16 of the animal chew 10 may be produced using generally conventional plastics processing techniques. The manufacture of the shank 12, the end pieces 14, 16 may also be produced using traditional plastics processing techniques. The end pieces 14, 16 may be designed to be conveniently formed by injection molding. Alternative forming processes may include compression molding, blow molding, etc.

The shank 12 may be formed using various processes. Desirably, the manufacturing technique may allow the outer layer 18 to form a circumferentially continuous layer over the core 20, thereby reducing the opportunity for a chewing animal to damage the outer layer 18. Consistent with this, the shank may be formed by a co-extrusion process, whereby the soft or resilient outer layer 18 is extruded over an extruded core 20. Alternatively, the outer layer 18 may be continuously molded over the core 20, which itself may be either extruded or molded. Still alternatively, the outer layer 18 and the core 20 may be formed separately and then assembled, as by pulling and tensioning the outer layer 18 over the core 20.

In this referenced manufacturing scheme it may be desirable to use an interface liquid to aid placement of the outer layer 18 over the core 20. The interface liquid may include a lubricant or adhesive that may set. Accordingly, after the outer layer 18 is positioned over the core 20 and the interface liquid has set, the outer layer 18 may resist movement relative to the core 20. Of course, even though an animal may not generally have contact with the interface liquid, it may be desirable for the interface liquid to be non-toxic. Suitable interface liquids may nonetheless include single component adhesives (cyano-acrylates), dual component adhesives (epoxy type resins), hot-melt adhesives, ethylene-vinyl acetate dispersions, etc.

The foregoing description was intended for the purposed of illustration rather than limitation. It will be understood by those having skill in the art that the invention herein is susceptible to numerous variations and modification without departing from the spirit thereof. Accordingly, the scope of the invention should only be limited by the scope of the claims appended hereto.

What is claimed is:

1. An animal chew for chewing by an animal consisting of:
a body portion including an outer layer of elastomeric material having a first hardness on the Shore A scale of about 40A to 90A selected from the group consisting of natural rubber, polyurethane rubber, and thermoplastic elastomer, and a rigid supporting core at least partially covered by said outer elastomeric layer, said body portion having first and second end sections with an edge section thereof; and
first and second end pieces each including a raised ridge section and having a hardness on the Shore D scale of about 50D to 90D and engaging said outer layer of said body portion, wherein said raised ridge section of said first and second end pieces overlies and protects said edge section of said body portion from contact with said animal during said chewing via said raised ridge section, wherein each of the first and second end pieces includes an opening, wherein said body portion having first and second end sections is received in said opening and wherein said opening in said end piece defines a diameter $d_1$, and said body portion having a first and second end section defines a diameter $d_2$ at said first and second end section, and $d_1 < d_2$, wherein said body portion having a first and second end section with an edge thereof is engaged in said opening in said end pieces, and wherein said opening compresses upon said end section when said edge section is engaged with said opening.

2. The animal chew according to claim 1 wherein said first and second end pieces comprise a thermoplastic material.

3. The animal chew according to claim 2 wherein said first and second end pieces comprise a nylon material.

4. The animal chew according to claim 1 wherein said core comprises a nylon material.

5. The animal chew of claim 1 wherein the entirety of said body portion including said outer layer is made of an elastomer material.

6. An animal chew for chewing by an animal consisting of:
a body portion including an outer layer of elastomeric material having a first hardness on the Shore A scale of about 40A to 90A selected from the group consisting of natural rubber, polyurethane rubber, and thermoplastic elastomer, and a rigid supporting core at least partially covered by said outer elastomeric layer, said body portion having first and second end sections with an edge section thereof; and first and second end pieces each including a raised ridge section and having a hardness on the Shore D scale of about 50D to 90D and engaging said outer layer of said body portion, wherein said raised ridge section of said first and second end pieces overlies and protects said edge section of said body portion from contact with said animal during said chewing via said raised ridge section, wherein each of the first and second end pieces includes an opening, wherein said body portion having first and second end sections is received in said opening and wherein said opening in said end piece defines a diameter all, and said body portion having a first and second end section defines a diameter d2 at said first and second end section, and d1 d2, wherein said body portion having a first and second end section with an edge thereof is engaged in said opening in said end pieces, and wherein said opening compresses upon said end section when said edge section is engaged with said opening;

wherein at least one of said body portion or said end pieces includes a protrusion.

* * * * *